United States Patent
Bossard (10) Patent No.: US 12,157,668 B2
(45) Date of Patent: Dec. 3, 2024

(54) SYSTEM AND METHOD OF PRODUCING ULTRA-PURE HYDROGEN ON-DEMAND FROM A SUPPLY OF LIQUID AMMONIA

(71) Applicant: Peter R. Bossard, Ivyland, PA (US)

(72) Inventor: Peter R. Bossard, Ivyland, PA (US)

( * ) Notice: Subject to any disclaimer, the term of this patent is extended or adjusted under 35 U.S.C. 154(b) by 0 days.

(21) Appl. No.: 18/194,620

(22) Filed: Apr. 1, 2023

(65) Prior Publication Data

US 2024/0327209 A1  Oct. 3, 2024

(51) Int. Cl.
*C01B 3/04* (2006.01)

(52) U.S. Cl.
CPC ...... *C01B 3/047* (2013.01); *C01B 2203/0277* (2013.01); *C01B 2203/0822* (2013.01); *C01B 2203/085* (2013.01); *C01B 2203/0866* (2013.01); *C01B 2203/1058* (2013.01); *C01B 2203/1614* (2013.01); *C01B 2210/0046* (2013.01)

(58) Field of Classification Search
CPC ............ C01B 3/047; C01B 2203/0277; C01B 2203/0822; C01B 2203/085; C01B 2203/0866; C01B 2203/1058; C01B 2203/1614; C01B 2210/0046
See application file for complete search history.

(56) References Cited

U.S. PATENT DOCUMENTS

| | | |
|---|---|---|
| 3,338,681 A | 8/1967 | Kordesch |
| 4,687,578 A | 8/1987 | Stookey |
| 5,013,437 A | 5/1991 | Trimmer et al. |
| 5,205,841 A | 4/1993 | Vaiman |
| 5,376,167 A | 12/1994 | Broutin et al. |
| 5,518,530 A | 5/1996 | Sakai et al. |

(Continued)

FOREIGN PATENT DOCUMENTS

JP  2013095618 A  *  5/2013

OTHER PUBLICATIONS

Garca-Garcia et al. "High purity hydrogen production by low temperature catalytic ammonia decomposition in a multifunctional membrane reactor" Catalysis Communications 9 (2008) 482-486 (Year: 2008).*

*Primary Examiner* — Anthony J Zimmer
*Assistant Examiner* — Syed T Iqbal
(74) *Attorney, Agent, or Firm* — LaMorte & Associates, P.C.

(57) ABSTRACT

A system and method of efficiently producing ultrapure hydrogen from ammonia using a single energy efficient processing step. Ammonia is introduced into reaction cells. Each reaction cell has a first tube of hydrogen permeable material that is concentrically positioned within a second tube of hydrogen impermeable material. The concentric orientation between the first tube and the second tube creates a very narrow reaction gap space between the two tubes. The reaction cell is heated to an operational temperature that is efficient for the heat cracking of ammonia and which makes the first tube highly permeable to hydrogen. Ammonia is introduced into the gap space, wherein the ammonia cracks into nitrogen and hydrogen. The hydrogen contacts the first tube and permeates through the first tube. Accordingly, the cracking of ammonia and the separation of hydrogen occurs in the same reaction cell at the same time using the same heat energy.

14 Claims, 6 Drawing Sheets

(56) References Cited

U.S. PATENT DOCUMENTS

| | | | |
|---|---|---|---|
| 5,614,001 A | 3/1997 | Kosaka et al. | |
| 5,820,655 A | 10/1998 | Gottzmann et al. | |
| 5,931,987 A | 8/1999 | Buxbaum | |
| 6,183,543 B1 | 2/2001 | Buxbaum | |
| 6,461,408 B2 | 10/2002 | Buxbaum | |
| 6,565,632 B1 | 5/2003 | van Hassel et al. | |
| 6,569,226 B1 | 5/2003 | Dorris et al. | |
| 6,899,744 B2 | 5/2005 | Mundschau | |
| 6,919,062 B1* | 7/2005 | Vasileiadis | C01B 3/48 423/652 |
| 7,396,385 B1 | 7/2008 | Bossard et al. | |
| 7,704,485 B1* | 4/2010 | Bossard | C01B 3/503 429/210 |
| 2006/0112636 A1* | 6/2006 | Chellappa | H01M 16/006 423/658.2 |
| 2016/0115019 A1* | 4/2016 | Bossard | H01M 8/0687 429/434 |

* cited by examiner

SYSTEM AND METHOD OF PRODUCING ULTRA-PURE HYDROGEN ON-DEMAND FROM A SUPPLY OF LIQUID AMMONIA

BACKGROUND OF THE INVENTION

1. Field of the Invention

In general, the present invention relates to systems and methods that are used to crack ammonia to obtain nitrogen gas and hydrogen gas. More particularly, the present invention relates to the structure of reaction chambers where cracking reactions are produced and where hydrogen gas is isolated.

2. Prior Art Description

In industry, there are many applications for the use of ultra-pure hydrogen. For instance, there are many PEM fuel cells that operate using hydrogen. The hydrogen, however, must be ultra-pure. In the art, ultra-pure hydrogen is commonly considered to be hydrogen having purity levels of at least 99.999%. Any molecules of ammonia, carbon dioxide, carbon monoxide, water vapor or other contaminant gases that are received by the fuel cell either reduces its efficiency or causes damage to the fuel cell.

Free hydrogen gas does not exist naturally on earth to any significant extent. This is because hydrogen reacts with many elements and readily combines to form more complex molecules. As a consequence, hydrogen gas must be manufactured by removing it from other more complex molecules. Hydrogen gas can be manufactured in a number of ways. For instance, hydrogen gas can be produced by splitting water molecules through electrolysis. However, the power needed for electrolysis is always significantly greater than the power available from a fuel cell that may be fueled by the hydrogen gas. Any fuel cell system that obtains hydrogen gas from electrolysis, therefore, results in a net power loss.

Techniques have been developed where hydrogen gas can be produced as a byproduct of various chemical reactions. For instance, hydrogen is created when a hydrocarbon fuel and water undergone an endothermic reaction. This initial endothermic reaction requires high temperatures depending mostly on the initial hydrocarbon fuel being used. In the reaction, the hydrocarbon fuel and water are converted in an endothermic reaction into resultant gases that include hydrogen (H2), carbon monoxide (CO), methane (CH4), carbon dioxide (CO2) and water (H2O). The useful chemical energy in the resultant gases is contained in the H2, CO, CH4 and CO2. The chemical energy in these resultant gases contains the chemical energy that was originally in the hydrocarbon fuel, plus some of the endothermic energy that was used to heat the reaction. In a second stage process, the resultant gases of H2, CH4, CO and CO2 are then mixed with steam at an elevated temperature wherein a water gas shift reaction is induced. Once the water gas shift reaction is induced, the CO present in the resultant gases reacts with the water (H2O). The CO and the H2O react to produce carbon dioxide and hydrogen. A third process is than used to separate the hydrogen from the carbon dioxide.

In such prior art processes, obtaining purified hydrogen from a hydrocarbon requires three energy consuming steps. In the first step, the hydrocarbon is cracked with heat to produce reaction gases. In a second step, the reaction gases are reacted with water. In a final step, hydrogen is separated from the reaction gases.

Due to the large power requirements of obtaining hydrogen gas from water electrolysis or hydrocarbon steam reformation, alternative processes are preferred that can be operated in a more energy efficient manner. One of the most energy efficient reactions that produce byproduct hydrogen involves the cracking of ammonia. When ammonia is heated in an inert atmosphere, the ammonia breaks down into nitrogen gas and hydrogen gas using the following formula:

$$2NH_3 \rightarrow N_2 + 3H_2$$

Accordingly, for every two molecules of ammonia that are cracked, three molecules of hydrogen gas can be created. The only other byproduct gas is nitrogen gas, which is considered non-toxic and can be released directly into the atmosphere if unwanted. In addition to these benefits, ammonia cracking can be efficiently performed at temperatures as low as 380 degrees Celsius. However, cracking ammonia to obtain hydrogen is still a two step process. Energy is used to crack the ammonia. Once the ammonia is cracked, more energy must be expended to separate the hydrogen gas from the nitrogen gas and the remnant ammonia. This is particularly difficult if the hydrogen gas must be of ultra-high purity.

A need therefore exists for a system that can take advantage of the benefits of obtaining hydrogen by cracking ammonia, yet can produce usable ultra-pure hydrogen without expending any more energy through the use of a secondary separation process. This need is met by the present invention as described and claimed below.

SUMMARY OF THE INVENTION

The present invention is a system and method of efficiently producing ultrapure hydrogen from ammonia using a single energy efficient processing step. Ammonia is introduced into one or more reaction cells. Each reaction cell has a first tube of hydrogen permeable material that is concentrically positioned within a second tube of hydrogen impermeable material. The concentric orientation between the first tube and the second tube creates a very narrow reaction gap space between the two tubes. The reaction cell is heated to an operational temperature that is efficient for the heat cracking of ammonia and which makes the first tube highly permeable to hydrogen.

Ammonia is introduced into said gap space, wherein the ammonia cracks into nitrogen and hydrogen. The hydrogen contacts the first tube, wherein at least some of the hydrogen permeates through the first tube and is separated from the nitrogen. Accordingly, the cracking of ammonia and the separation of hydrogen occurs in the same reaction cell at the same time using the same heat energy.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention ammonia processing system and method can be configured in multiple ways, only two exemplary embodiments are illustrated. The exemplary configurations are being shown for the purposes of explanation and description. The exemplary configurations set forth two of the best modes contemplated for the operation of the system. The illustrated embodiments, however, are merely exemplary and should not be considered limitations when interpreting the scope of the appended claims.

Figure 1:
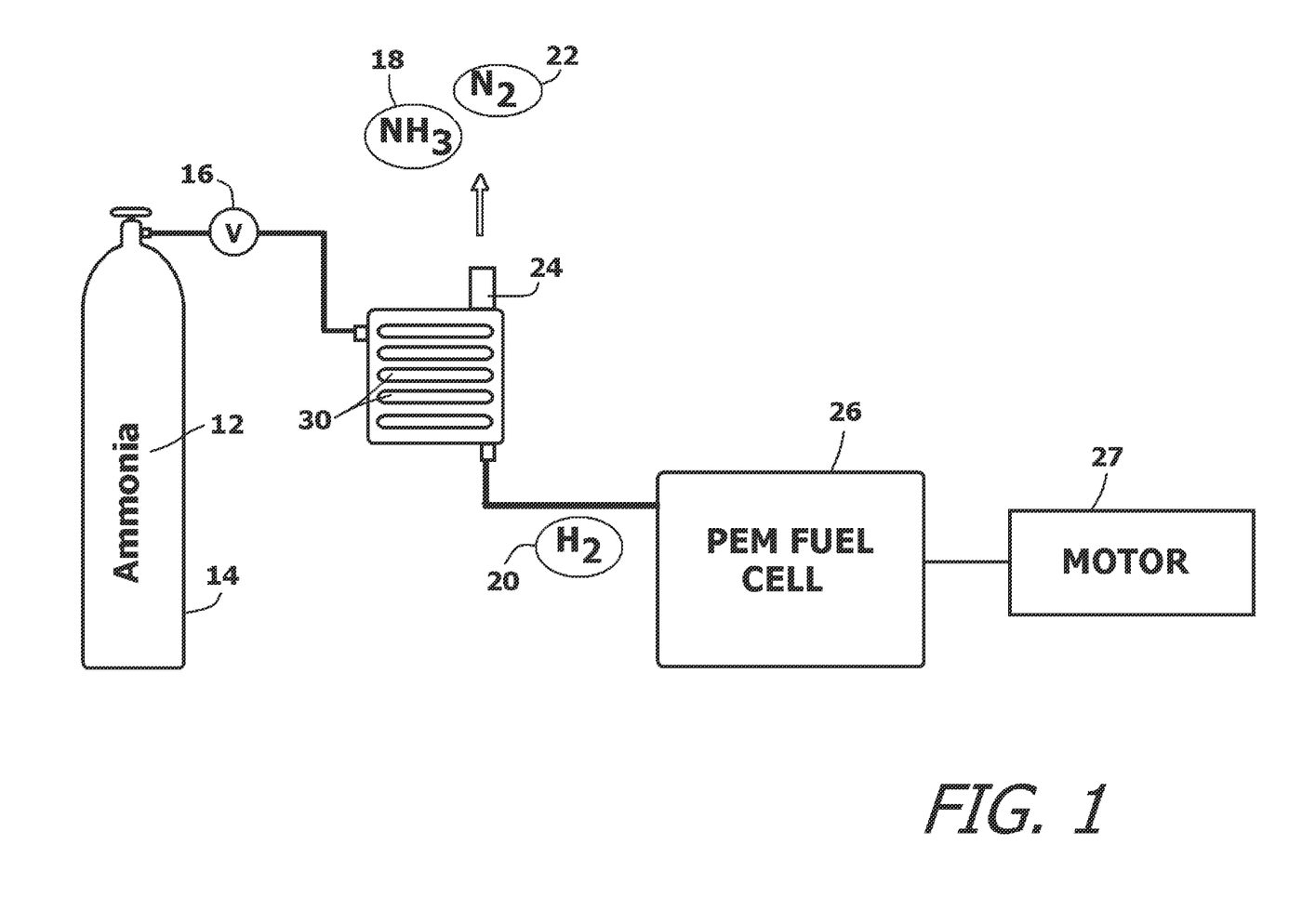
FIG. 1 is a schematic of an exemplary embodiment of a fuel cell system powered by the present invention ammonia processing system.

Referring to FIG. 1, a schematic is shown that illustrates the intended use of the present invention ammonia processing system 10. The ammonia processing system 10 is attached to a source of ammonia 12, which is typically stored and transported in pressurized tanks 14. The pressurized tanks 14 store the ammonia 12 until needed by the ammonia processing system 10. A control valve 16 controls the flow of ammonia 12 into the ammonia processing system 10. As will be explained, once the ammonia processing system 10 is at its operating temperature, the ammonia processing system 10 cracks any ammonia 12 that enters. This produces hydrogen 20 and waste gases 18. As a result, the control valve 16 that controls the flow of ammonia 12 into the ammonia processing system 10 also controls the flow of hydrogen 20 out of the ammonia processing system 10.

The ammonia processing system 10 also acts as purifier that separates the hydrogen 20 from the waste gases 18. The separated hydrogen 20 is ultrapure. The waste gases 18 include mostly nitrogen gas 22 and very small amounts of residual ammonia 12 that may remain uncracked. The waste gases 18 are directed out through a vent 24 into the atmosphere or into a gas collector. As a result, the ammonia processing system 10 can directly produce ultrapure hydrogen 20 that is immediately ready for use.

Although the ammonia processing system 10 can be used to generate ultrapure hydrogen 20 for a variety of industrial applications, the present invention ammonia processing system 10 is particularly well suited for use in generating ultrapure hydrogen 20 on demand for a proton exchange membrane (PEM) fuel cell 26. The PEM fuel cell 26 produces electricity and can be used to power one or more electric motors 27 to drive a ship, a truck, a bus, or the like. Generating ultrapure hydrogen 20 on demand from ammonia 12 has may advantages over storing hydrogen gas directly. Ammonia can be stored at a much higher density than can hydrogen gas. Furthermore, for every two molecules of ammonia that is stored, three molecules of hydrogen can be produced. Ammonia is also far less expensive of a commodity than is ultrapure hydrogen. Furthermore, ammonia does not require specialized containers and fittings that are required when storing ultrapure hydrogen gas.

Figure 2:
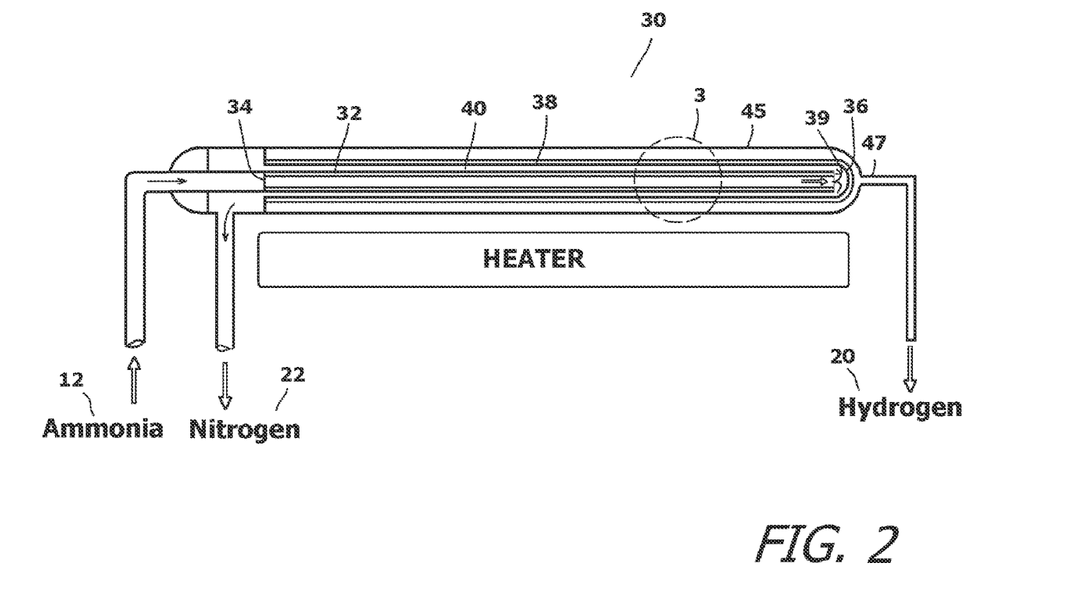
FIG. 2 is a cross-sectional view of a reaction cell utilized by the ammonia processing system of FIG. 1.
Figure 3:
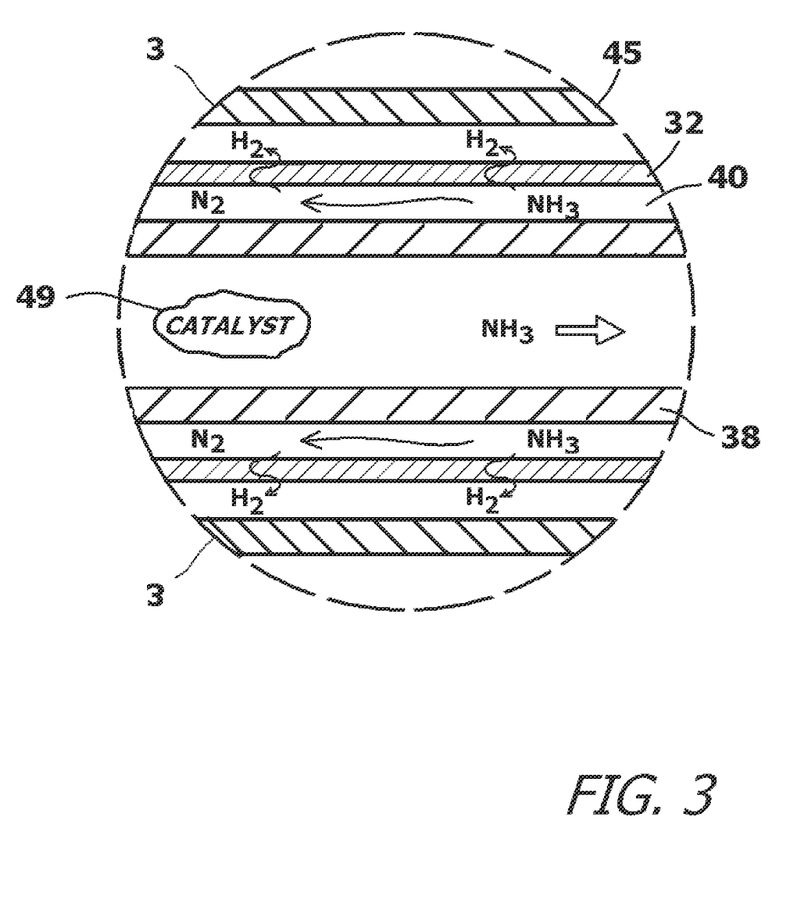
FIG. 3 is an enlarged view of the section of FIG. 2 contained in circle 3.

One or more reaction cells 30 are provided inside the ammonia processing system 10. The number of reaction cells 30 utilized depends upon the needs of the overall system. That is, the on-demand supply requirements for the overall system. Referring to FIG. 2 and FIG. 3, a first exemplary embodiment of a single reaction cell 30 is shown. It will be understood that dozens or hundreds of such reaction cells 30 can be used in a single system. However, since all the reaction cells 30 function in the same manner, a single reaction cell 30 is shown for the purpose of simplicity and clarity in description.

Each reaction cell 30 has concentric tube structures. In each reaction cell 30 is a hydrogen permeable tube 32. The hydrogen permeable tube 32 can be made from pure palladium, but is preferably made of a hydrogen permeable palladium alloy. The preferred hydrogen permeable palladium alloys include palladium-silver alloys and a palladium-copper alloys. Such alloys are permeable to hydrogen gas and no other gases when heated above 300 degrees Celsius.

The hydrogen permeable tube 32 has an open first end 34 and a closed second end 36. A supply tube 38 is provided that extends into the open end 34 of the hydrogen permeable tube 32. The supply tube 38 is impermeable to hydrogen and is made of Hastelloy®, stainless steel, or some other alloy that does not react to either ammonia or hydrogen. The supply tube 38 is connected to the ammonia tank 14, wherein the ammonia tank 14 supplies a flow of ammonia 12 into the interior of the supply tube 38. The supply tube 38 has an open discharge end 39 that is located near the closed second end 36 of the hydrogen permeable tube 32.

The inside diameter of the hydrogen permeable tube 32 is only a few hundred microns larger than the inside diameter of the supply tube 38. This creates a very narrow reaction gap space 40 between the exterior of the shell tube 38 and the interior of the hydrogen permeable tube 32. The reaction gap space 40 is very small, preferably being no larger than 3000 microns. The best size for the reaction gap 40 is between 100 microns and 1000 microns. In such a confined space, the ammonia 12 experiences highly turbulent flow and the molecules of ammonia 12 are forced to contact the interior surface of the hydrogen permeable tube 32 numerous times.

The supply tube 38 receives the supply of the ammonia 12 and directs that gas into the reaction gap space 40. As a result, the ammonia 12 is forced to flow around the exterior of the supply tube 38 where it can interact with the material of the hydrogen permeable tube 32. The hydrogen permeable tube 32 is internally pressurized by the ammonia 12 being supplied. Since the hydrogen permeable tube 32 is internally pressurized, the hydrogen permeable tube 32 can be made very thin without concern of pressure deformation.

The ammonia 12 flows out of the supply tube 38 and into the reaction gap space 40. The reaction gap space 40 in each reaction cell 30 functions as a cracking reactor, wherein the ammonia 12 is cracked into nitrogen 22 and hydrogen 20. However, since the exterior wall of the reaction gap space 40 is made from a hydrogen permeable alloy, each reaction cell 30 also functions as a hydrogen separator. The hydrogen 20 produced by the ammonia cracking reaction comes into contact with the hydrogen permeable tube 32. The hydrogen 20 is absorbed and passes through the hydrogen permeable tube 32. As a result, the hydrogen gas 20 is removed from the reaction gap space 40. The hydrogen permeable tube 32 is surrounded by a collection tube 45. The collection tube 45 gathers the separated hydrogen 20 and direct the hydrogen 20 into a hydrogen output tube 47. Furthermore, the hydrogen 20 passing into the hydrogen permeable tube 32 is ultrapure since only pure hydrogen gas can pass through the alloy of the hydrogen permeable tube 32 at the operating temperature.

Within the reaction gap space 40, heat is required to crack the ammonia 12 into nitrogen 22 and hydrogen 20. The reaction cell 30 is externally heated. The heat conducts through reaction cell 30 and heats the reaction gap space 40 to its operating temperature. The preferred operating temperature is 380 degrees Celsius. However, the operating temperature range can be between 350 degrees Celsius and 450 degrees Celsius. In this temperature range, the ammonia 12 cracks into nitrogen 22 and hydrogen 20 and the cracking reaction runs to exhaustion. By spreading the ammonia 12 very thinly throughout the reaction gap space 40, a highly efficient cracking reaction can be created, wherein most all of the ammonia 12 is converted to nitrogen 22 and hydrogen 20 before leaving the reaction cell 30. If desired or needed, a catalyst can be added in the supply tube 38 and/or the reaction gap space 40 to increase the efficiency of the ammonia cracking reaction. Appropriate catalysts include nickel and nickel alloys.

Figure 4:
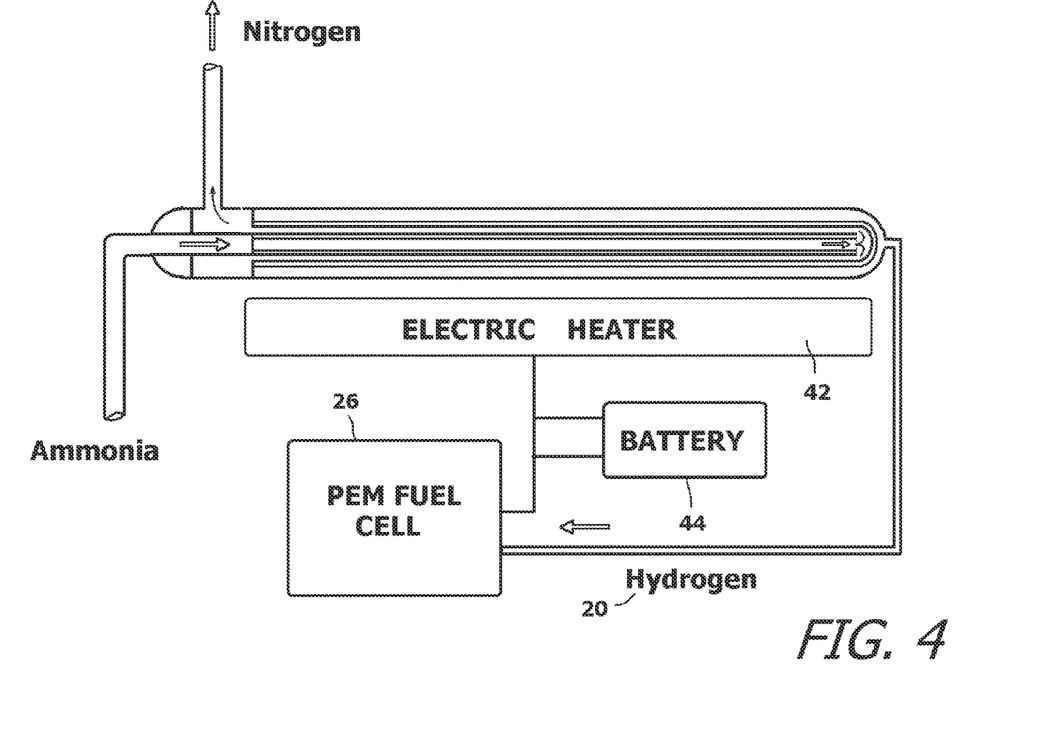
FIG. 4 is a schematic showing a first heating system that can be used to heat the reaction cells in the ammonia processing system.

The operating temperature is maintained by heating the exterior of the reaction cell 30. Referring to FIG. 4, it can be seen that this can be achieved using electric heaters 42, such as induction heaters. Such heaters 42 are preferred if the ultrapure hydrogen 20 being collected is being used to power a PEM fuel cell 26. Some of the electricity generated by the PEM fuel cell 26 can be used to power the electric heaters 42. A small battery 44 can be kept in reserve to power the electric heaters 42 from a cold start.

Figure 5:
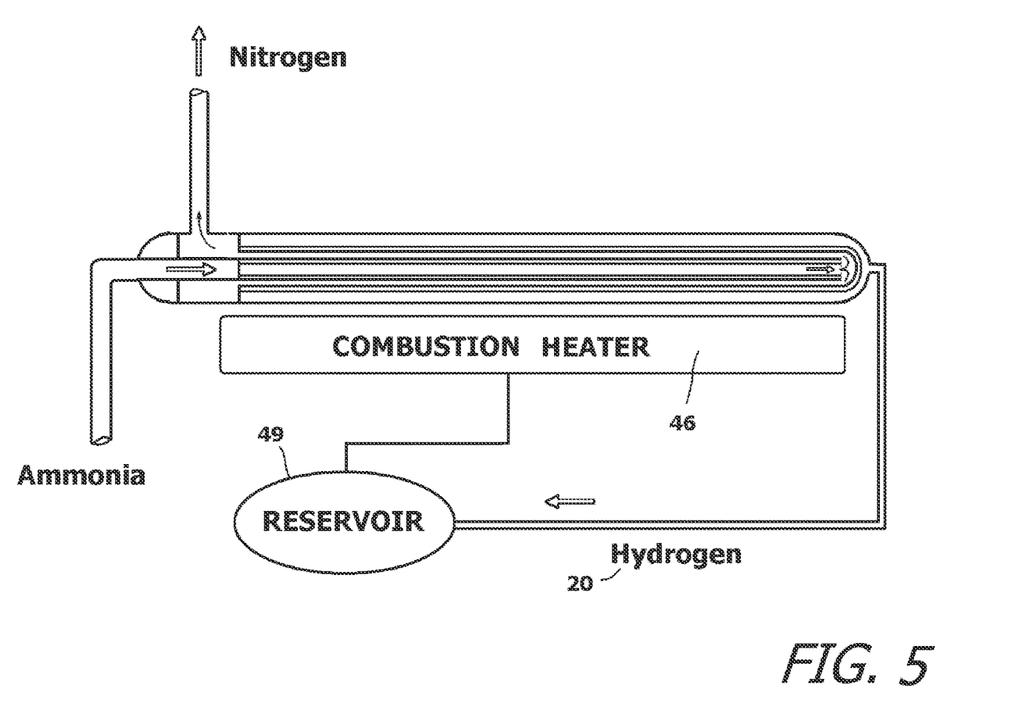
FIG. 5 is a schematic showing a second heating system that can be used to heat the reaction cells in the ammonia processing system.

Referring to FIG. 5, it will be understood that there are many scenarios where the ultrapure hydrogen 20 being collected is used for a purpose other than for the generation of electricity. In such a scenario, the operating temperature can be achieved by burning some of the hydrogen 20 being generated. As hydrogen is separated, a small amount is bled away to supply burners 46. The burners 46 heat the exterior of the shell tube 38. Secondary chimney tubes 48 can be used to confine the flame and the heat of combustion and direct that heat against the exterior of the reaction cell. A small reservoir 49 of hydrogen gas can be maintained to provide a source of hydrogen during cold starts. If the hydrogen is deemed too valuable to waste for heating, less expensive secondary fuel gasses, such as propane or natural gas can be used.

Figure 6:
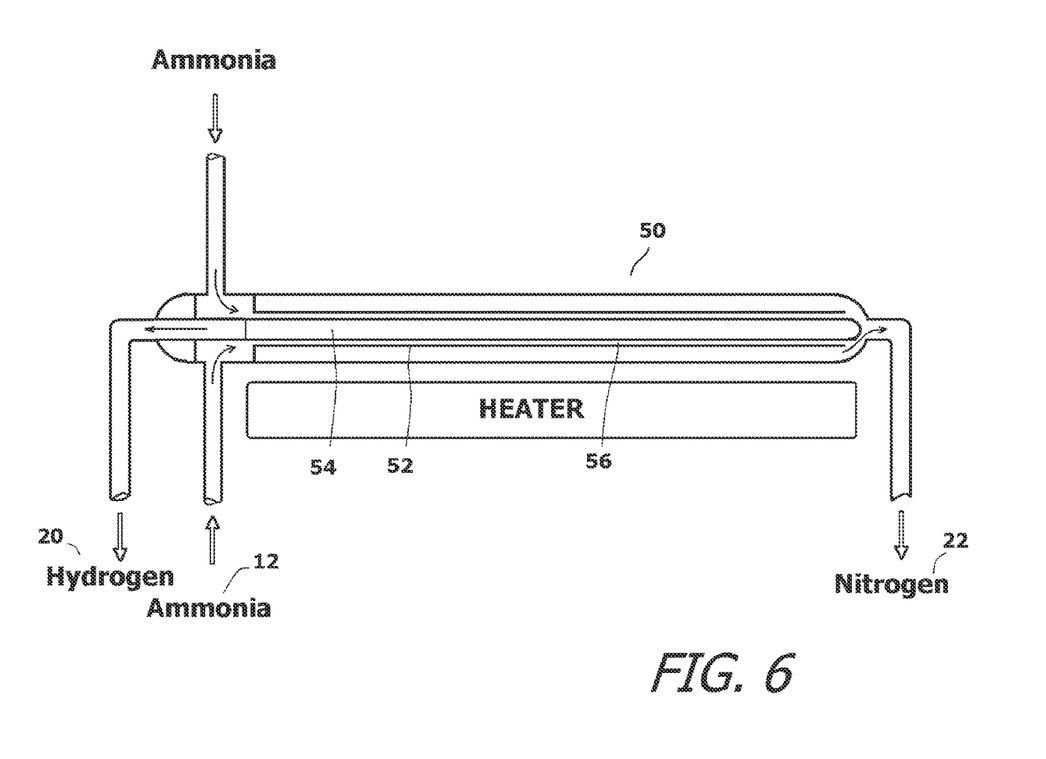
FIG. 6 is a cross-sectional view of an alternate reaction cell design that is utilized by the present invention ammonia processing system.

Referring to FIG. 6, an alternate embodiment of the present invention system 50 is shown. In the earlier embodiments, the hydrogen permeable tube is located outside the supply tube. This configuration can be reversed. However, pressures must be carefully monitored to prevent any crushing deformation damage to the hydrogen permeable tube 54.

In this embodiment, the hydrogen permeable tube 54 is placed inside the supply tube 52. The inside diameter of the supply tube 52 is only slightly larger than the outer diameter of the hydrogen permeable tube 54. This creates a very small reaction gap space 56 between the supply tube 52 and the hydrogen permeable tube 54.

Ammonia 12 is introduced into the supply tube 52. In the supply tube 52, the ammonia 12 begins to crack into nitrogen 22 and hydrogen 20. The cracking ammonia 12 flows to the bottom of the supply tube 52 and is directed into the reaction gap space 56. In the react gap space 56, the process of cracking is completed. The resultant hydrogen 20 permeates through the hydrogen permeable tube 54 to the interior of the hydrogen permeable tube 54 where it is collected for use.

The embodiments of the ammonia processing system that are described and illustrated are merely exemplary and a person skilled in the art can make many changes using functionally equivalent configurations. All such variations, modifications, and alternate embodiments are intended to be included within the present invention as defined by the claims.

What is claimed is:

1. A method of efficiently producing ultrapure hydrogen from ammonia, said method comprising the steps of:
   providing a concentric tube structure having a first tube of hydrogen permeable material that concentrically encircles a second tube of hydrogen impermeable material, wherein said first tube of hydrogen permeable material is concentrically encircled by a collection tube;
   wherein said first tube of hydrogen permeable material extends from a first open end to an opposite second closed end; and
   wherein said second tube of hydrogen impermeable material extends through said first open end of said first tube of hydrogen permeable material, and is positioned concentrically inside said first tube of hydrogen permeable material so that a gap space exists between said first tube of hydrogen permeable material and said second tube of hydrogen impermeable material, wherein said gap space is no greater than 3000 microns wide;
   providing a catalyst in said gap space that assists said ammonia in cracking into nitrogen and hydrogen at an operational temperature;
   heating said gap space, said catalyst, and said first tube of hydrogen permeable material to said operational temperature;
   introducing ammonia through said second tube of hydrogen impermeable material and into said gap space, wherein said ammonia experiences turbulent flow in said gap space and cracks into nitrogen and hydrogen, wherein at least some of said hydrogen permeates through said first tube of said hydrogen permeable material and is collected in said collection tube.

2. The method according to claim 1, wherein said heating said gap space includes providing a combustion heating element external of said collection tube.

3. The method according to claim 2, further including fueling said combustion heating element with said hydrogen.

4. The method according to claim 2, wherein said heating said gap space includes providing an electric heating element external of said collection tube.

5. The method according to claim 1, wherein said first tube of hydrogen permeable material is made from a palladium based alloy.

6. The method according to claim 1, wherein said operational temperature is between 350 degrees Celsius and 450 degrees Celsius.

7. The method according to claim 1, wherein said catalyst is primarily nickel.

8. A method of producing hydrogen from ammonia, said method comprising the steps of:
   providing a reaction cell that contains a first tube of hydrogen permeable material, a second tube of hydrogen impermeable material, and a collection tube concentrically arranged so that said first tube of hydrogen permeable material encircles said second tube of hydrogen impermeable material and said collection tube encircles said first tube of hydrogen permeable material, wherein a gap space of no greater than 3000 microns exists between said first tube of hydrogen permeable material and said second tube of hydrogen impermeable material;

providing a heating element external of said reaction cell for heating said reaction cell to an operational temperature;

providing a catalyst in said gap space that assists ammonia in cracking into nitrogen and hydrogen at said operational temperature;

introducing said ammonia through said second tube of hydrogen impermeable material and into said gap space, wherein said ammonia experiences turbulent flow in said gap space and cracks into said nitrogen and said hydrogen;

wherein at least some of said hydrogen permeates through said first tube of said hydrogen permeable material and is collected in said collection tube.

9. The method according to claim 8, wherein providing a heating element for heating said gap space includes providing combustion heating element.

10. The method according to claim 9, further including fueling said combustion heating element with said hydrogen.

11. The method according to claim 8, wherein providing a heating element for heating said gap space includes providing electric heating element.

12. The method according to claim 8, wherein said first tube of hydrogen permeable material is made from a palladium based alloy.

13. The method according to claim 8, wherein said operational temperature is between 350 degrees Celsius and 450 degrees Celsius.

14. The method according to claim 8, wherein said catalyst is primarily nickel.

* * * * *